No. 824,753. PATENTED JULY 3, 1906.
J. H. STEPHENS.
HOSE COUPLING.
APPLICATION FILED SEPT. 30, 1904.
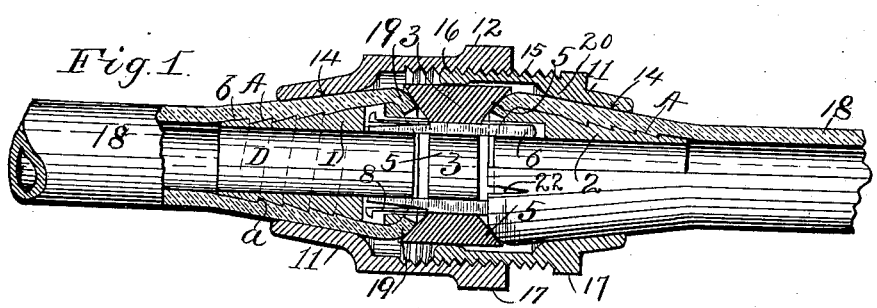
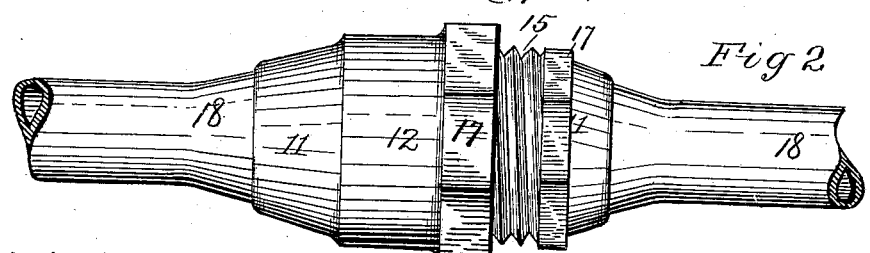
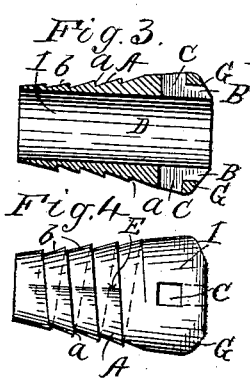
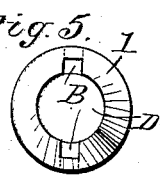
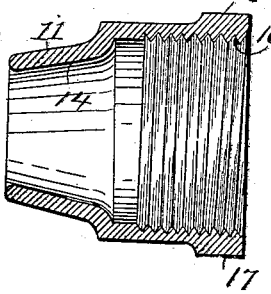
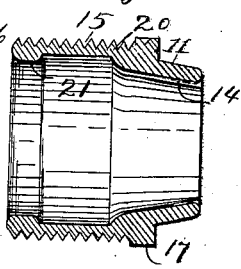
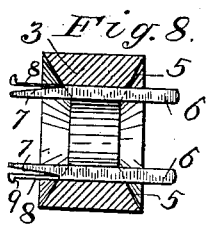
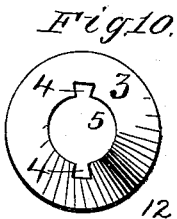
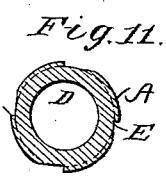
Witnesses
John J. Burch
Eyn Nut Hill
Inventor
John H. Stephens.
by Wm Rees Edelen
his Attorney

UNITED STATES PATENT OFFICE.

JOHN H. STEPHENS, OF VERNON, TEXAS.

HOSE-COUPLING.

No. 824,753.  Specification of Letters Patent.  Patented July 3, 1906.

Application filed September 30, 1904. Serial No. 226,642.

*To all whom it may concern:*

Be it known that I, JOHN H. STEPHENS, a citizen of the United States, residing at Vernon, in the county of Wilbarger and State of Texas, have invented new and useful Improvements in Hose-Couplings, of which the following is a specification.

This invention has reference to improvements in hose-couplings; and it consists of certain novel features of construction, which will be fully described in the specification, elucidated in the drawings, and clearly pointed out in the claims.

The object of this invention is to provide a hose-coupling that will be simple in its construction, durable and practical in all its parts, whereby an inexperienced person can manipulate it and make attachments without any instructions.

The invention is so constructed and arranged that an ordinary person without any mechanical ability can connect the two ends of a broken or ruptured hose by screwing the same on the screw-threaded inclined members through the medium of small bars, which are secured in a ring or washer centrally located between the opposing ends of said screw-threaded members. This washer is conical or flared on its internal periphery, so as to force and bend the hose ends firmly against the conical or flared surface of said washer. The hose ends are clamped and firmly secured on their respective inclined members by two opposing sleeves, one sleeve enveloping its adjacent sleeve through the medium of screw-threads on both sleeves, whereby turning the larger sleeve the free ends of the hose are firmly clamped and held in position. The tapering screw-threaded members have slots formed diametrically opposite each other and extending a part way into said members for small bars to enter for turning said members. There is also a mortise on opposite sides of one of the members for allowing a spring-catch to play and prevent the washer from becoming detached when the hose is uncoupled.

Figure 1 is a vertical longitudinal section of the improved hose-coupling with a portion in elevation. Fig. 2 is an elevation of the device as it would appear when in practical operation. Fig. 3 is a longitudinal section of one of the inclined screw-threaded members. Fig. 4 is an elevation of one of the inclined screw-threaded members. Fig. 5 is a front view of one of the members. Fig. 6 is a vertical section of the larger sleeve. Fig. 7 is a similar view of the smaller sleeve. Fig. 8 is a section of the flared washer with the bars in elevation. Fig. 9 is an elevation of the flared washer, partly broken away to exhibit the method of securing one of the spring-catches. Fig. 10 is an elevation of the flared washer with the bars removed. Fig. 11 is a section through one of the screw-threaded members, exhibiting the recesses on the screw-threads. Fig. 12 is a vertical longitudinal section of the hose-coupling with the washer centrally located between the hose ends somewhat modified.

The invention consists of two inclined screw-threaded members 1 and 2, respectively. These members have interposed between them a washer 3. Said washer carries two bars 6 6. The free ends of said bars 6 enter slots formed in the ends of said inclined screw-threaded members 1 and 2. Enveloping the screw-threaded members are hose ends 18. Said hose ends extend over and beyond said members and are drawn inwardly over the ends of said members by means of the flared washer 3. Embracing the outside of the hose ends are sleeves 12 and 20, which have inclined surfaces 14, so as to fit snugly on the hose ends. These sleeves are provided with screw-threads 15 and 16 for drawing the hose ends together through the medium of the inclined screw-threaded members. The screw-threaded member 1 is also provided with mortises C C for allowing the free ends of spring-catches 8 to play therein. These spring-catches are secured by screws 10 to bars 6 6. (See Fig. 9.) The catch portion 9 enters said mortises C. The ends of the bars 6 are cut away, as shown at 7, for allowing the springs 8 to be depressed when entering the mouth of the screw-threaded member 1. The screw-threads A on the inclined members are of peculiar construction. They are inclined, as shown at $b$, and have a shoulder $a$, which is approximately vertical for the purpose of preventing the hose from slipping off of the inclined members. Equidistant around the screw-threads A are recesses E for preventing the hose from becoming unscrewed, as hose will unscrew itself when twisting it around. The ends of the screw-threaded members are inclined, as at G, for allowing the curved hose ends 19 to rest thereon and become parallel with the inclined or flared periphery 5 of the washer 3. This washer has dovetailed slots 4 4 for receiving the bars 6 6 previously referred to. The sleeves 12 and 20 are inclined on their rear portions, as indicated at 11 11, and their opposite ends are provided with hexagon nuts 17, which are integral with said sleeves. Sleeve 20 is provided with an annular rib 21 (see Fig. 7) for centering the washer 3 when assembling the coupling, otherwise undue strain would come on the bars 6 and bend them.

In Fig. 1 a portion of the hose on the right-hand member is shown in elevation for exhibiting the slot 22, a number of them being formed at the hose ends, especially when large hose are employed, but for ordinary garden-hose the ends can remain perfect at their ends, as the resilience of the rubber will accommodate the inclined screw-threaded members 1 and 2, respectively. When the coupling is disassembled, the washer 3 remains in the screw-threaded member 1 by means of the spring-catches 8, as the catch 9 impinges on the walls of the mortises C when said washer is resting loosely within said member 1.

In Fig. 12 the same construction is shown as that in Fig. 1, with the exception of the ends of the hose being square and a plain washer 3$^A$ being employed. This washer can be made of any suitable material—rubber, or indurated fiber, or metal.

When assembling the improved hose-coupling, the hose ends 18 are screwed on the incline of the threaded member 1 or 2, and the sharp portions $a$ of the screw-threads are embedded into the rubber of the hose; also the recesses E come into play at this stage of assembling, as the hose cannot become unscrewed, as the soft material enters these recesses and fills it in a measure. When one of the hose ends is screwed completely on the member 1 or 2, the other member is then screwed on its member 1 or 2; but in screwing the hose ends on said members said members must be held firmly. This is accomplished by the bars 6 6, which are located in the slots B of both members, which act as a screw-driver. After the hose ends contact the inclined or flared washer 3 then the sleeves 12 and 20 are employed for drawing the parts firmly together, thus forcing the ends of the hose in the position, as shown at 19, against the face of the flared washer aforesaid. It will be observed that the mortises C are of sufficient size to allow the members to be drawn closely together, as far as it is possible, for the purpose in view. The bars 6 6 can be dispensed with and an ordinary screw-driver can be inserted within the bore of the members 1 and 2 until the inclined edges of the screw-driver wedge within the slots B, when it can be turned for the purpose of securing the members 1 and 2 of the hose ends, respectively.

Having described the invention, that which I desire to secure by Letters Patent of the United States is—

1. A hose-coupling consisting of two screw-threaded members hose ends enveloping said members, a washer interposed between said members, bars passing through said washer and into said members, and the means for drawing said members and hose ends adjacent to each other for the purpose as specified.

2. A hose-coupling consisting of two screw-threaded members which are inclined on their external surface, for receiving hose ends, in combination with a flared washer interposed between said screw-threaded members, engaging the free ends of the hose ends, bars passing through said flared washer and engaging said members for the purpose as specified.

3. A hose-coupling consisting of two screw-threaded members which are inclined on their external periphery for receiving hose ends, in combination with a flared washer interposed between said members and hose ends, bars passing through said washer and engaging said members, sleeves for securing said hose ends, for the purpose as shown and described.

4. A hose-coupling consisting of two inclined screw-threaded members a washer interposed between said members, hose ends enveloping said members, sleeves adapted to secure the hose ends to said members, and a rib on the internal periphery of the smaller sleeve for contacting the external periphery of said washer for keeping it in alinement as shown and described.

5. A hose-coupling consisting of screw-threaded members, hose ends enveloping said members, a washer interposed between said members and hose ends, bars secured in said washer and projecting beyond said washer into recesses formed in said screw-threaded members for the purpose as shown and described.

6. A hose-coupling consisting of two screw-threaded members which are inclined or tapering at the screw-threaded portions of said members, hose ends enveloping said members and extending over and beyond the ends of said members, a flared washer for turning down said hose ends in combination with bars secured within said flared washer, and extending into recesses formed in said screw-threaded members for the purpose as specified.

7. In a hose-coupling, the combination with opposing sleeves screw-threaded to each other, of opposing members within said sleeves having inclined and screw-threaded surfaces, and notches in the screw-threads, and hose ends placed between said members and sleeves, and a flared washer for turning down said hose ends, as shown and specified.

In testimony whereof I affix my signature in presence of two subscribing witnesses.

JOHN H. STEPHENS.

Witnesses:
 W. REES EDELEN,
 LORING CHAPPEL.